United States Patent [19]
Suda et al.

[11] Patent Number: 5,974,370
[45] Date of Patent: *Oct. 26, 1999

[54] SYSTEM FOR REVIEWING ITS PROCESSING AND METHOD THEREFOR

[75] Inventors: Aruna Rohra Suda; Suresh Jeyachandran, both of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/579,735

[22] Filed: Dec. 28, 1995

[30] Foreign Application Priority Data

Dec. 28, 1994 [JP] Japan .................................. 6-327447

[51] Int. Cl.⁶ .................................................. G06F 17/28
[52] U.S. Cl. .................................................. 704/2; 704/1
[58] Field of Search .................................. 395/752, 759, 395/792–795, 803; 704/1, 2, 4, 5, 7–10; 707/1, 530, 531, 532, 536

[56] References Cited

U.S. PATENT DOCUMENTS

| | | | |
|---|---|---|---|
| 4,859,091 | 8/1989 | Ueda | 400/63 |
| 4,923,314 | 5/1990 | Blanchard, Jr. et al. | 395/794 |
| 5,010,486 | 4/1991 | Suzuki et al. | 395/755 |
| 5,136,654 | 8/1992 | Ganong, III et al. | 395/2.47 |
| 5,200,893 | 4/1993 | Ozawa et al. | 395/793 |
| 5,282,265 | 1/1994 | Suda et al. | 395/12 |
| 5,303,150 | 4/1994 | Kameda | 395/759 |
| 5,535,120 | 7/1996 | Chong et al. | 395/753 |
| 5,550,741 | 8/1996 | Nakajima | 395/803 |
| 5,576,955 | 11/1996 | Newbold et al. | 395/795 |

FOREIGN PATENT DOCUMENTS

| | | | |
|---|---|---|---|
| 435349A2 | 7/1991 | European Pat. Off. | G06F 17/28 |
| 568319A2 | 11/1993 | European Pat. Off. | G06F 17/28 |

OTHER PUBLICATIONS

B. Sheth, et al., "Evolving Agents For Personalized Information Filtering", Proceedings Of The Ninth Conference On Artificial Intelligence For Applications, Mar. 1, 1993, Institute Of Electrical And Electronics Engineers, pp. 345–352.

*Primary Examiner*—Frantzy Poinvil
*Attorney, Agent, or Firm*—Fitzpatrick, Cella, Harper & Scinto

[57] ABSTRACT

To accurately perform a process of natural language information, such as a process for generating a sentence from a concept, or a process for recognizing each character which constitutes a sentence, if, after input information is processed and the processed results thereof are output, a part of the output processed results is corrected, the process for the entire input information is reviewed on the basis of the corrected result. As a result, the corrected results of a certain portion can be reflected in another portion.

21 Claims, 12 Drawing Sheets

---

Forms of Expression :

Infinitive Form  : ···to attend···

✓ Gerundial Form : ...for attending...

Since the sentence construction is ' ···coming to USA··· ' , use of infinitive form will result in repetition of 'to'

---

I am working on Cognitive Science using your theory of learning.
I would like to discuss LWS with you.

Since I am coming to USA ⟨for attending⟩ the IJCAI conference, I would like to take this opportunity to meet you, if possible. I shall be grateful if you can find some time for me after 7th May 95.
　Kindly reserve accommodation for me to stay in a suitable hotel.

Forms of Expression :

Infinitive Form  : ···to attend···

√ Gerundial Form  : ...for attending...

Since the sentence construction is ' ···coming to USA··· ', use of infinitive form will result in repetition of 'to'

---

I am working on Cognitive Science using your theory of learning. I would like to discuss LWS with you.

Since I am coming to USA  the IJCAI conference, I would like to take this opportunity to meet you, if possible. I shall be grateful if you can find some time for me after 7th May 95.

Kindly reserve accommodation for me to stay in a suitable hotel.

FIG. 10

Synonyms :

obliged : most formal term used when obligation to other party is greater
    thankful : most commonly used   ✓  grateful : more formal & polite than thankful I am working on Cognitive Science using your theory of learning. I would like to discuss LWS with you.

Since I am coming to USA for attending the IJCAI conference, I would like to take this opportunity to meet you, if possible. I shall be  if you can find some time for me after 7th May 95.
  Kindly reserve accommodation for me to stay in a suitable hotel.

SYSTEM FOR REVIEWING ITS PROCESSING AND METHOD THEREFOR

BACKGROUND OF THE INVENTION

1. Field of the Invention

The present invention relates to a system for reviewing its processing which is run once on the basis of corrections for processing results and a method therefor.

2. Description of the Related Art

Hitherto, a system for completely replacing the values of defaults in the system has been proposed.

For example, in a Japanese front end processor (FEP), for an input pronunciation of kanji, the system first displays a default kanji of a first candidate. With regard to this, when the user requests another candidate, the system replaces the displayed candidate with another candidate and displays it.

Also, in an optical character recognition (OCR) apparatus, and a character recognition apparatus, such as an online or offline handwriting character recognition apparatus, a plurality of possible candidates are sought beforehand for the character to be recognized, the apparatus outputs the most probable candidate from among the candidates, and is able to replace it with another candidate if the user makes a request.

In another example, in a feedback system relating to temperature, water pressure or the like, feedback for controlling a process for a next input is performed. Further, there is a system for pointing out errors in an input, such as a spell checker.

As described above, there has been an increasing need for correcting the results of the process performed by the system. However, in the above-described conventional system, changing of the output default value to another value by the user, may affect a portion which is logically dependent on the portion which is currently being changed but which has been already processed, and therefore merely the changing of that portion is insufficient.

For example, in the case of the above-described FEP, the change of one kanji or word affects the selection of another word before or after the kanji or the word. With regard to this, hitherto, only what is commonly called learning, for example, the contents of this selection are memorized, and these contents are used for later processes, is performed. However, regarding the effect on the already selected kanji or word, no correction can be made.

In a similar manner, also in respect of character recognition, the change of an output candidate should be a clue to the recognition of the adjacent portion. However, it is not possible to change the portion on the basis of such change of another portion.

On the other hand, in the control system for performing feedback, the process of an input after the current input is affected, and no influence is exerted upon the results of the input process before the current input.

SUMMARY OF THE INVENTION

Accordingly, it is an object of the present invention to provide a system capable of reflecting a correction made in one portion of the process result in another portion of the process result and a method therefor.

It is another object of the present invention to provide a system for reviewing the input information or part thereof on the basis of corrections made externally for a part of the result of processing.

According to one aspect, the present invention which achieves these objectives relates to a reviewing system, comprising: input means for inputting information; processing means for processing input information from said input means; output means for outputting the processed results of said processing means; correcting means for correcting a part of the processed results output from said output means; and control means for controlling said processing means so that a processing of said input information or a part thereof is reviewed on the basis of the corrected results by said correcting means.

According to another aspect, the present invention which achieves these objectives relates to a reviewing system, comprising the steps of: inputting information; processing information input from the inputting step; outputting the processed results of the processing step; correcting a part of the processed results output from the outputting step; and controlling the processing step on the basis of the corrected results in the correcting step so that the processing of the input information or a part thereof is reviewed.

Other objectives and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 7, which is composed of FIGS. 7A and 7B, is a flowchart illustrating the procedure for searching for a word;

DESCRIPTION OF THE PREFERRED EMBODIMENT

A preferred embodiment of the present invention will be explained below in detail with reference to the accompanying drawings.

Figure 1:
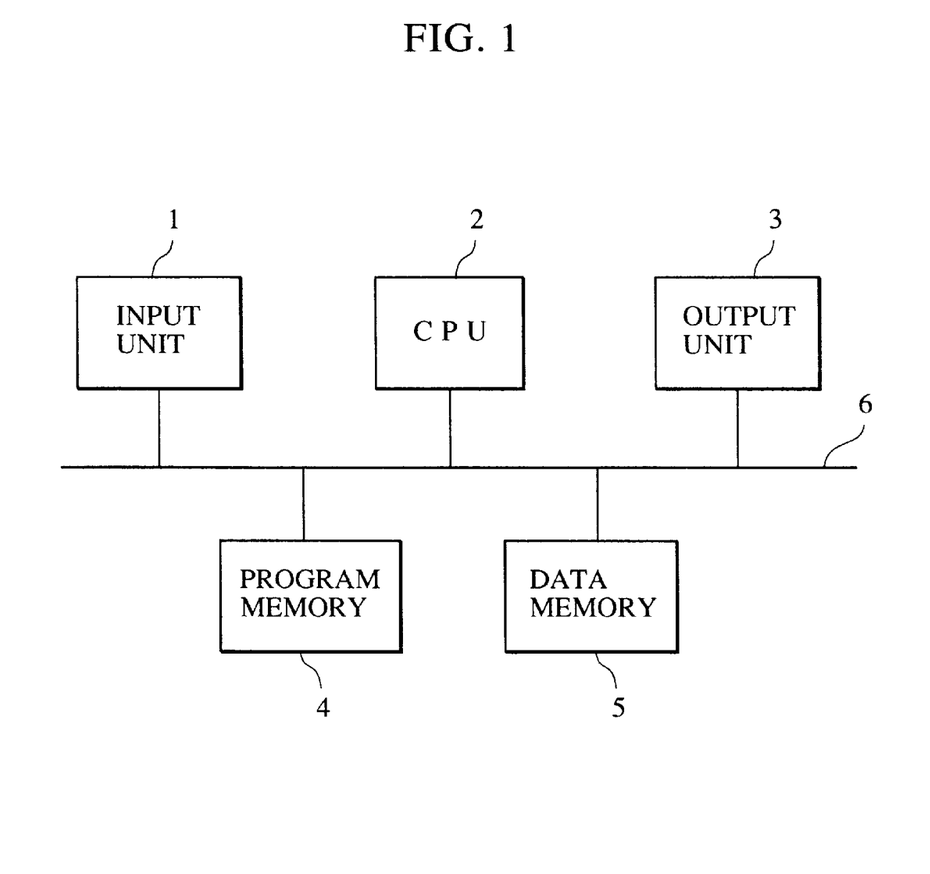
FIG. 1 is a block diagram illustrating the hardware configuration of one embodiment of a reviewing system in accordance with the present invention.

FIG. 1 is a block diagram illustrating the hardware configuration of one embodiment of a reviewing system in accordance with the present invention.

Referring to FIG. 1, an input unit 1 inputs information in the form of natural language. Hereinafter, input information is referred to as a sentence. In this apparatus, a sentence, if it has a fixed ordered structure, can be made to be a processing object even if the sentence is not a grammatically complete sentence.

The input unit 1 is a unit for inputting information. Examples of the input unit 1 are a speech recognition apparatus for inputting and recognizing speech, a keyboard for inputting characters, a character recognition apparatus for optically reading characters from a document and recognizing them, an online/offline handwriting character recognition apparatus, and a receiving apparatus for receiving information from another system, for example, an apparatus for receiving a recognition result from a character recognition apparatus. Information generated from another process in the same apparatus may be an input in this case. In addition, two or more of these apparatuses may be provided and used selectively.

A CPU 2 performs operations, logical decisions, etc., for various processes, and controls each of the components connected to a bus 6.

An output unit 3 is a unit for outputting information. Examples of the output unit 3 are a speech synthesis apparatus for synthesizing a speech from character information and outputting it, a display apparatus, such as a CRT or a liquid-crystal display unit, a printer for printing out characters on a document, and a transmitting apparatus for transmitting information to another apparatus, such as a database. An output in this case may be an input to another process in the same apparatus, for example, a concept analyzer. In addition, two or more of these apparatuses may be provided and used selectively.

A program memory 4 is a memory for storing programs for control effected by the CPU 2, including procedures to be described later in accordance with a flowchart. The program memory 4 may be a ROM or RAM in which programs are loaded from an external storage apparatus.

A data memory 5 stores the contents of a knowledge base to be described later. The data memory 5 is made of, for example, RAM. It is assumed that the knowledge of the knowledge base is loaded from a non-volatile external storage medium prior to processing, or a reference is made thereto each time it becomes necessary.

The bus 6 transfers an address signal indicating a component to be controlled by the input unit 1, a control signal for controlling each component, and data exchanged between the component apparatuses.

Figure 2:
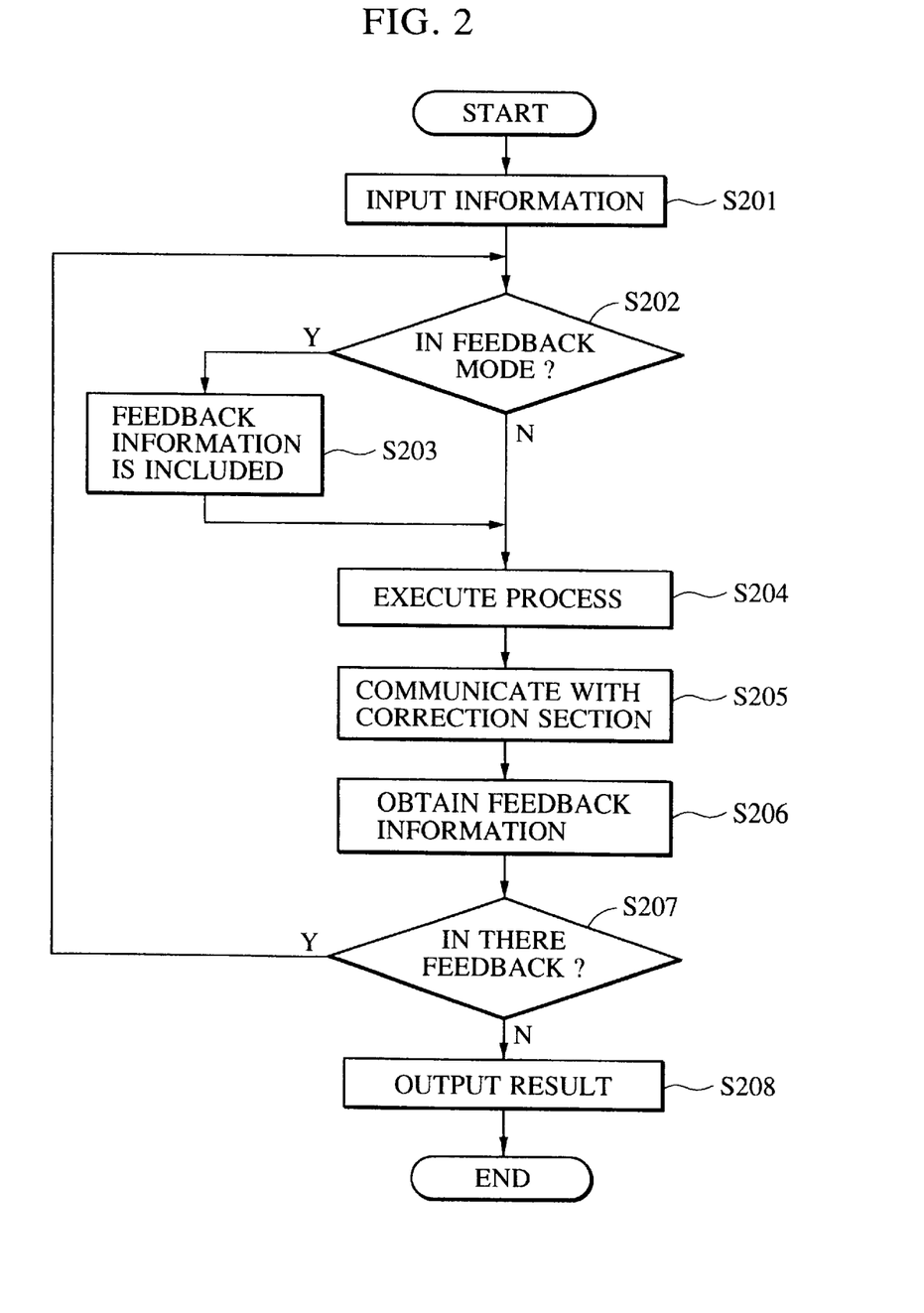
FIG. 2 is a flowchart of a reviewing process in accordance with the embodiment of the present invention.

FIG. 2 is a flowchart of a reviewing system in accordance with this embodiment.

Referring to FIG. 2, in step S201, information is input, and in step S202, a check is made to determine if the system is in the feedback mode. If the system is in the feedback mode, feedback information is included in the input information; if the system is not in the feedback mode, step S203 is skipped, and the process proceeds to step S204 where the input value is processed, and the processed result is stored. The above is the process of the main processor.

As a result of communication with a correction section in step S205, feedback information is obtained in step S206. In step S207, a determination is made whether feedback information has been obtained. When the feedback information has been obtained, the process returns to step S202. When the feedback information has not been obtained, the process proceeds to step S208 where the current result is output.

Figure 3:
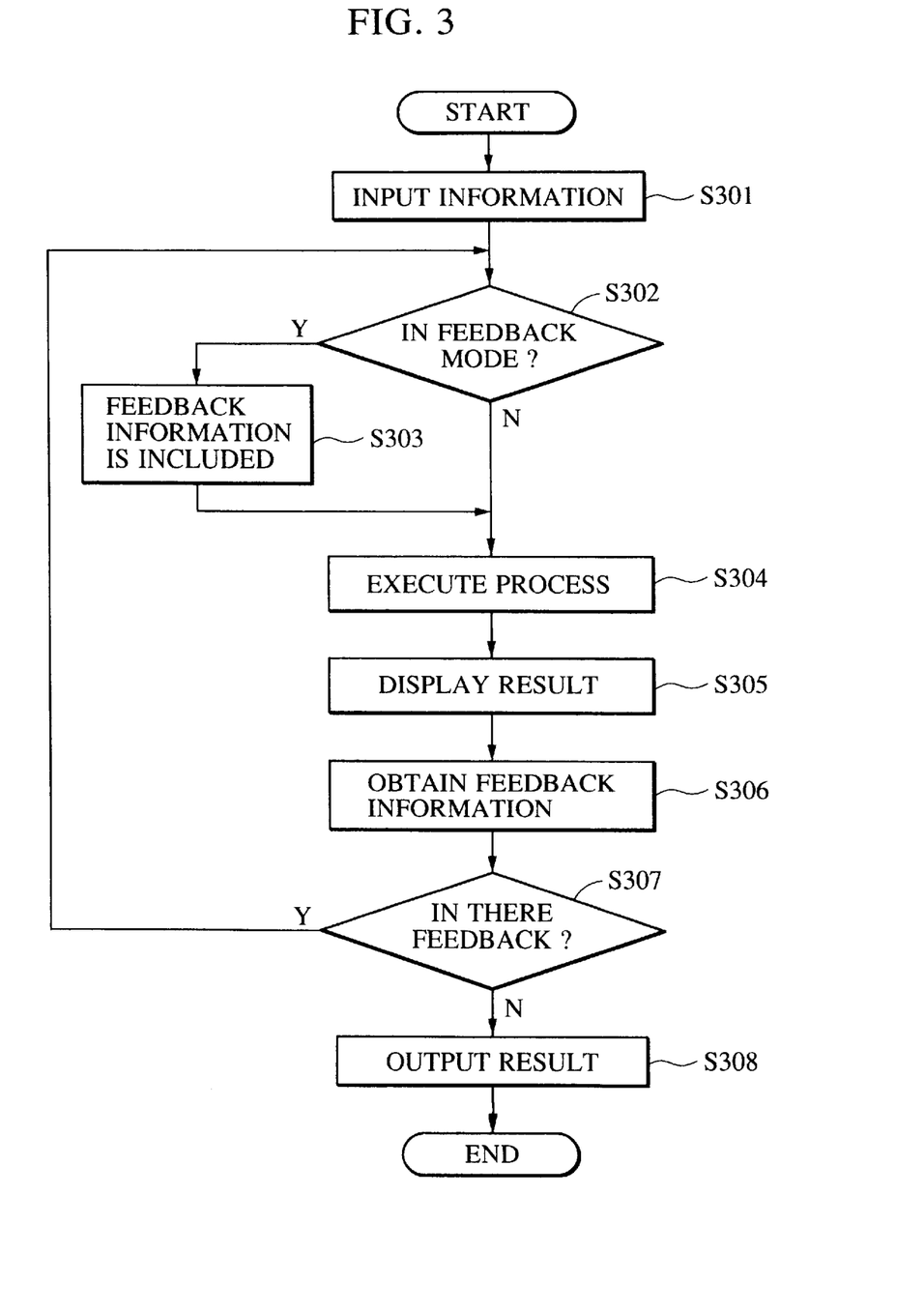
FIG. 3 is a flowchart of a reviewing process in a generator.

FIG. 3 is a flowchart of a reviewing process in the generator for generating and outputting corresponding natural language information from the input concept.

Referring to FIG. 3, in step S301, a concept set is input, and in step S302, a determination is made whether the system is in the feedback mode. If the system is in the feedback mode, in step S303, feedback information is included in the input information; if the system is not in the feedback mode, step 303 is skipped, and the process proceeds to step S304 where the input value is processed, and the processed result is stored. The above is the process of the main processing section of the generator and is executed by using a knowledge base 21.

In step S305, the generated natural language information, which is the processed result, is displayed for the user. In step S306, feedback information is obtained from the user. In step S307, a determination is made whether feedback information has been obtained. When the feedback information has been obtained, the process returns to step S302. When the feedback information has not been obtained, the process proceeds to step S308 where the current result is output.

Figure 4:
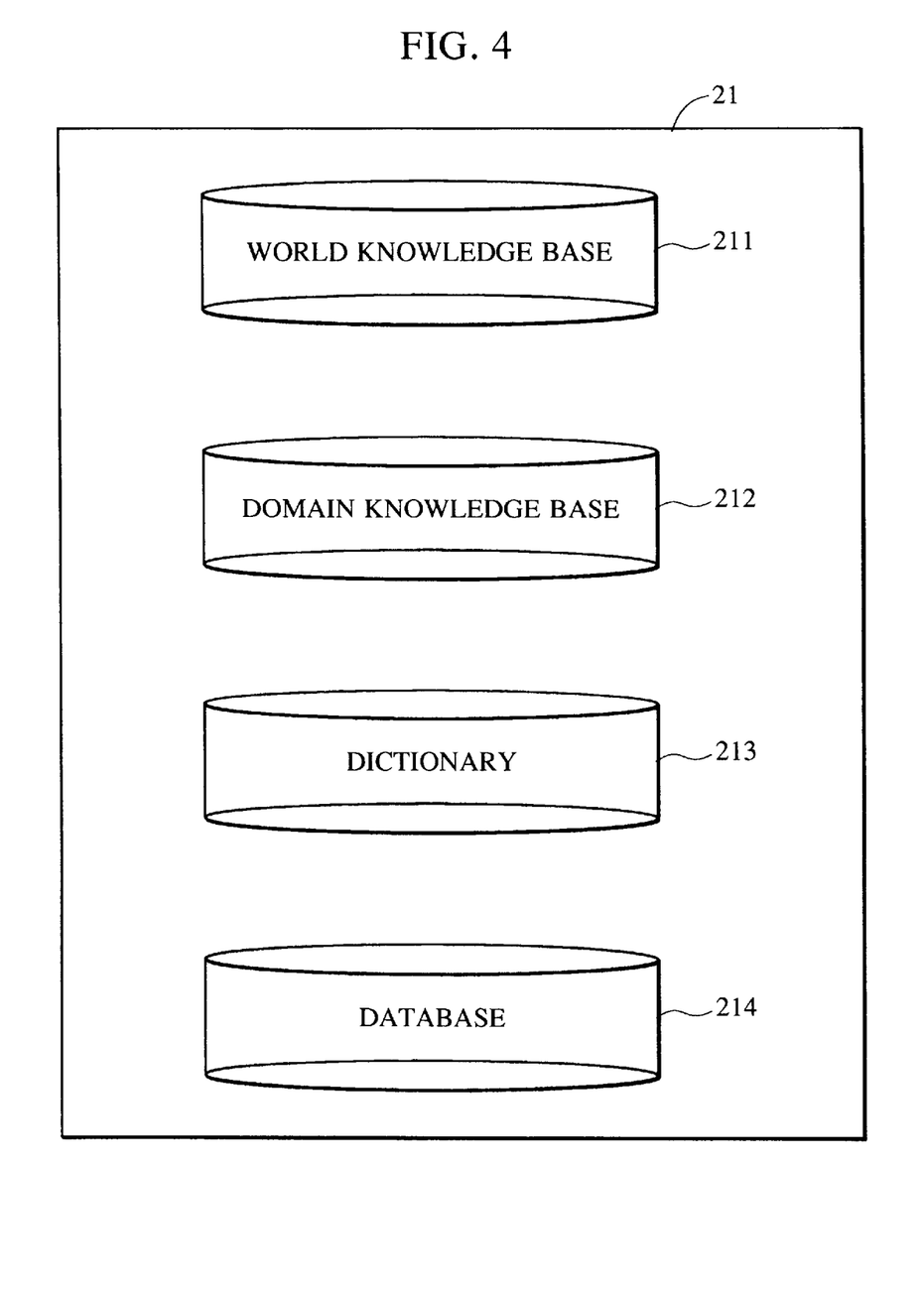
FIG. 4 shows the detailed structure of knowledge bases.

FIG. 4 shows the detailed contents of the knowledge base 21 provided in the data memory 5. A general knowledge base 211 has general knowledge, such as knowledge of "place". A domain knowledge base 212 has knowledge specific to the field of the processing object. A language knowledge base 213 has language information, such as parts of speech or grammar, and word meanings. Reference numeral 214 denotes a database of information specific to the user.

Figure 5:
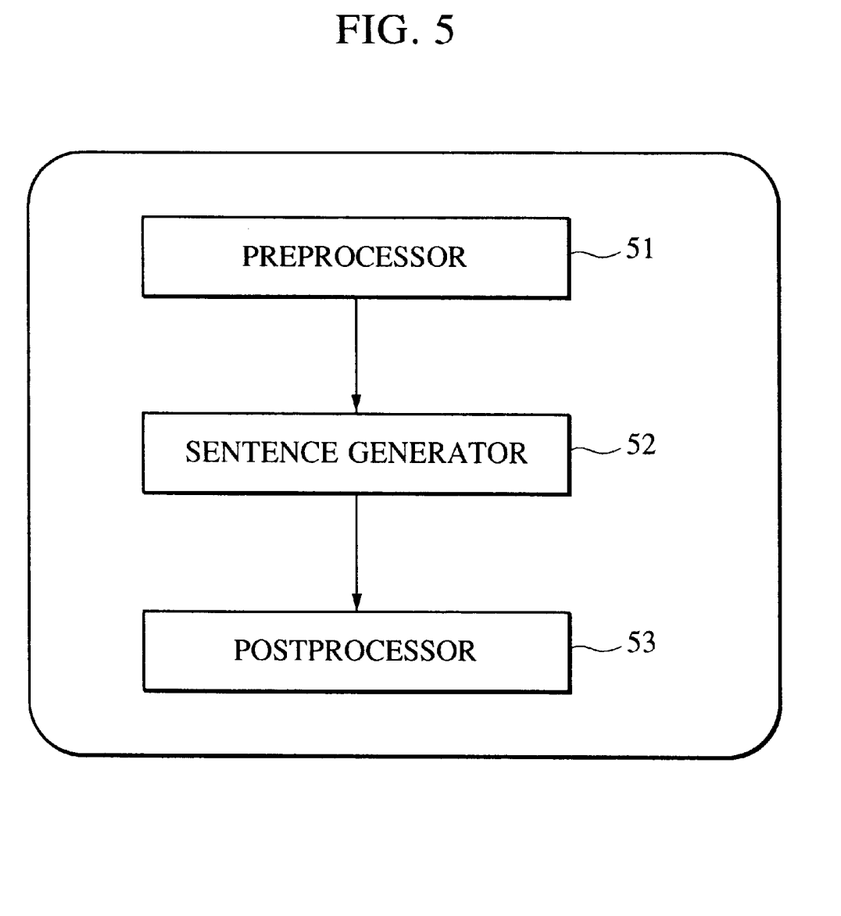
FIG. 5 is a functional block diagram illustrating the structure of the generator.

FIG. 5 is a functional block diagram illustrating the components of the generator. Reference numeral 51 denotes a preprocessor. Reference numeral 52 denotes a sentence generator. Reference numeral 53 denotes a postprocessor.

Figure 6:
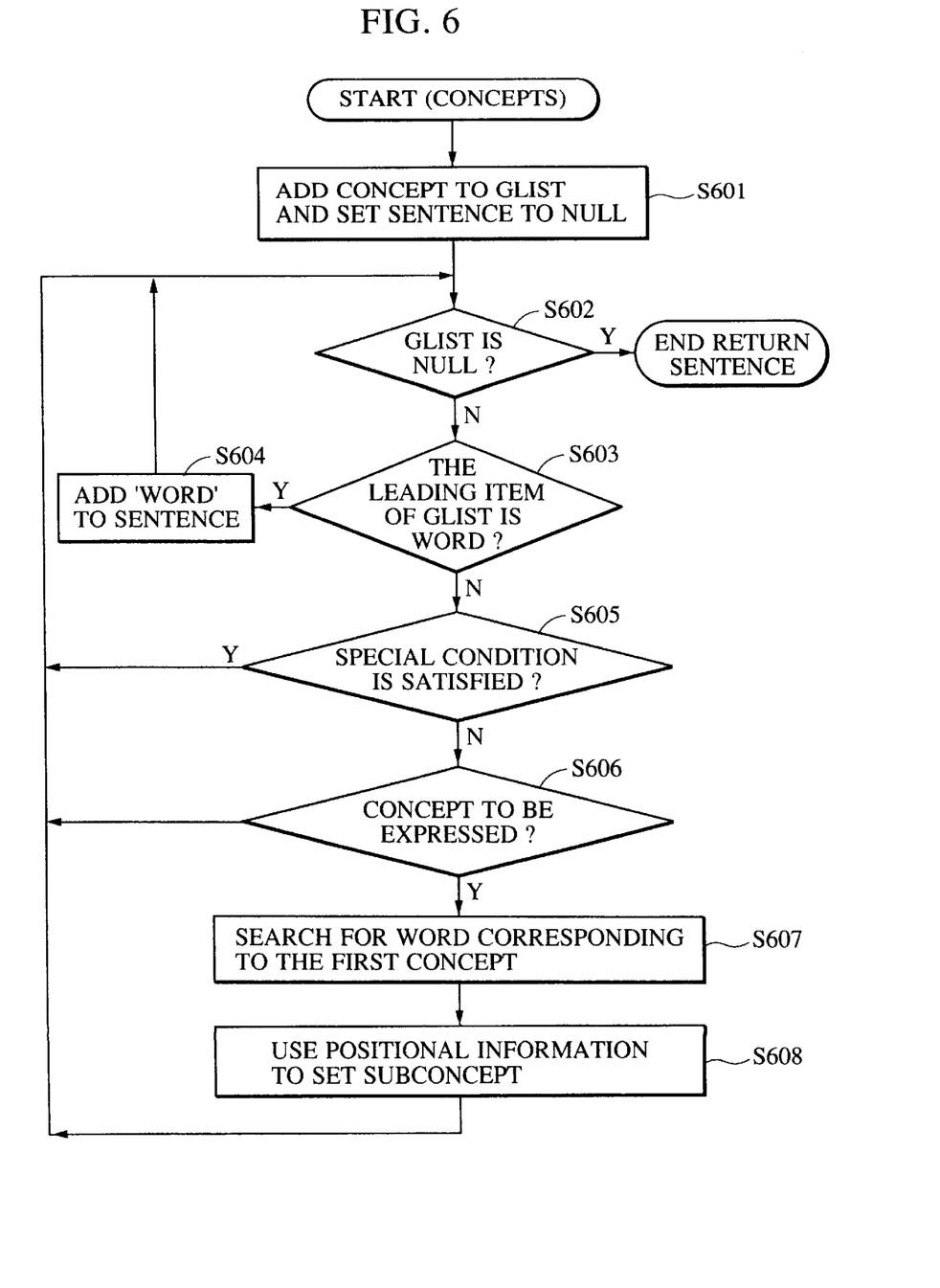
FIG. 6 is a flowchart illustrating the procedure of the sentence generator.

FIG. 6 is a flowchart illustrating the processing of the sentence generator.

Initially, in step S601, the input concept is added to GLIST, and SENTENCE is set to null.

In step S602, a determination is made whether GLIST is null. If it is null, SENTENCE is output, and the process is terminated. If the GLIST is not null, a check is made in step S603 to determine if the leading item of GLIST is a word. If the leading item of GLIST is a word, the word is added to the SENTENCE in step S604, and the process returns to step S603.

In step S603, if the leading item is not a word, the process proceeds to step S605 where a check is made to determine if a special condition is satisfied. If so, the process executes the requirements of the special condition and returns to step S602. If a special condition is not satisfied, the process proceeds to step S606 where a check is made to determine if the leading item is a concept to be expressed. If not so, the process returns to step S602, and if so, in step S607, a word corresponding to the first concept in the GLIST is searched, and from the position information, if any subconcepts are to be expressed, they are set on the GLIST in step S608, and the process returns to step S602.

Figures 7, 7A:
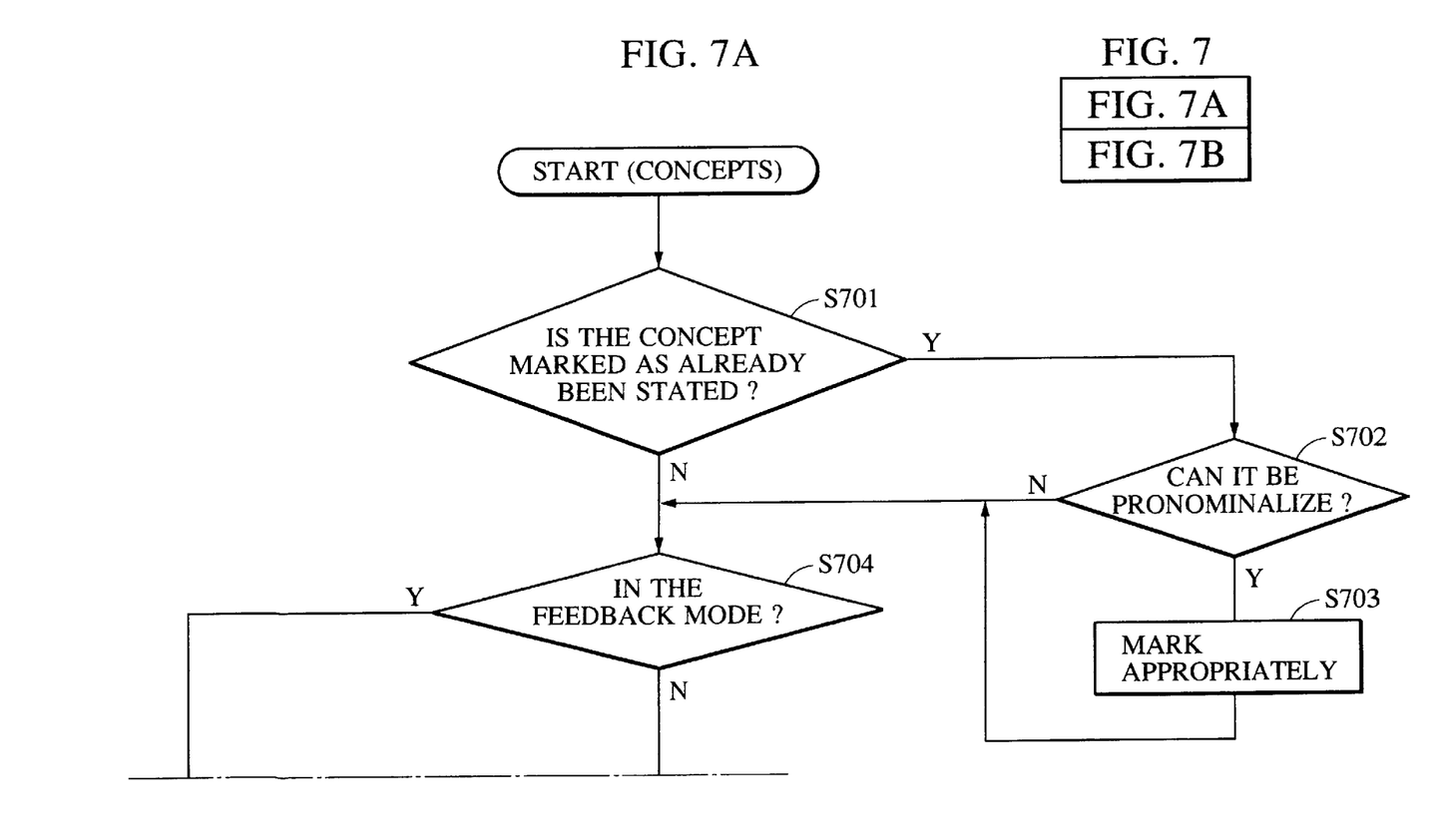
Figure 7B:
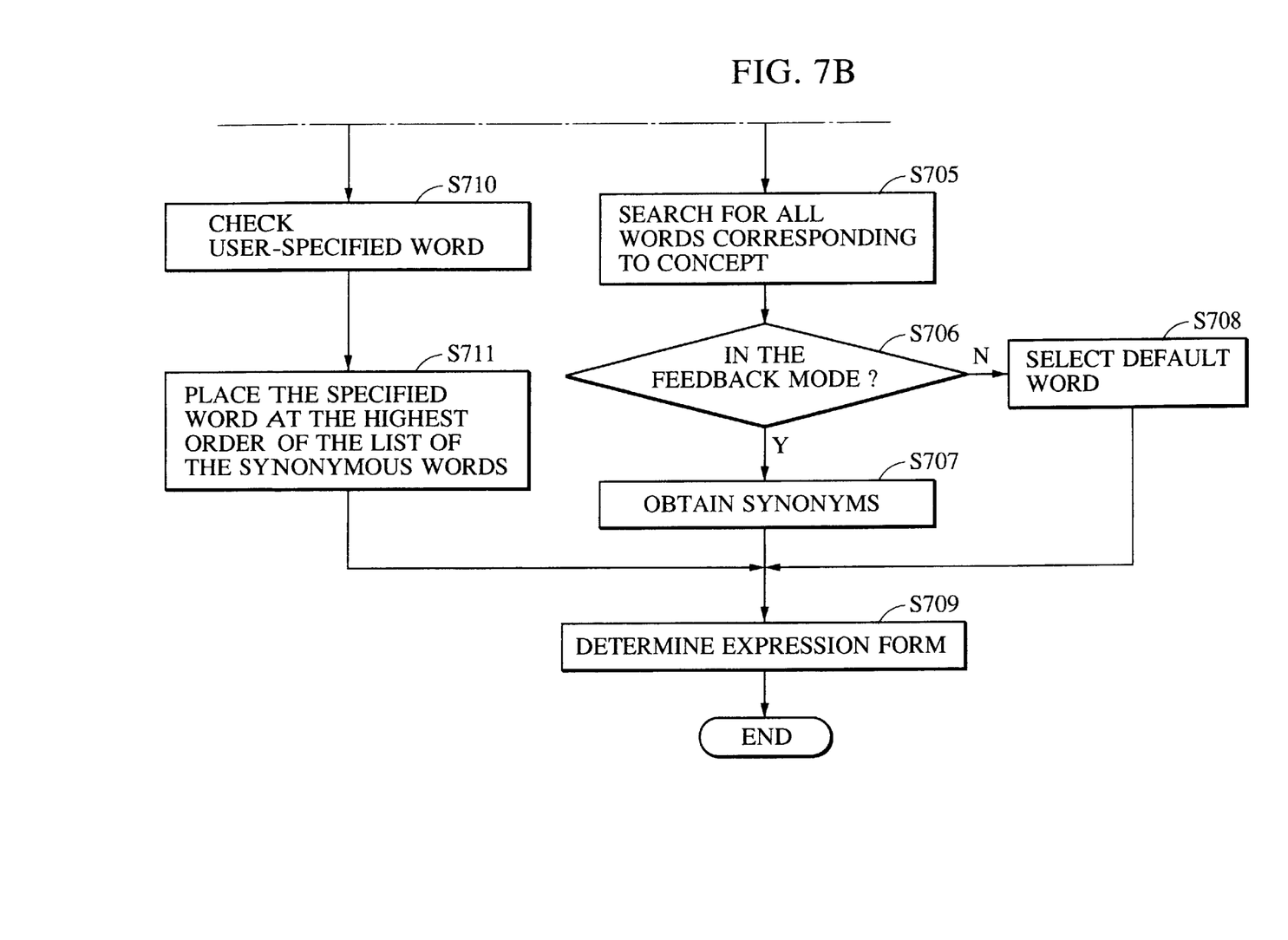

FIG. 7 is a flowchart illustrating the procedure for searching for a word.

As is clear from FIG. 7, in the feedback mode, a word specified by the user is used, and the language knowledge base 213 is updated to store this selection for later use. Also, the list of synonyms is updated so as to provide the highest priority to the word selected by the user.

Figure 8:
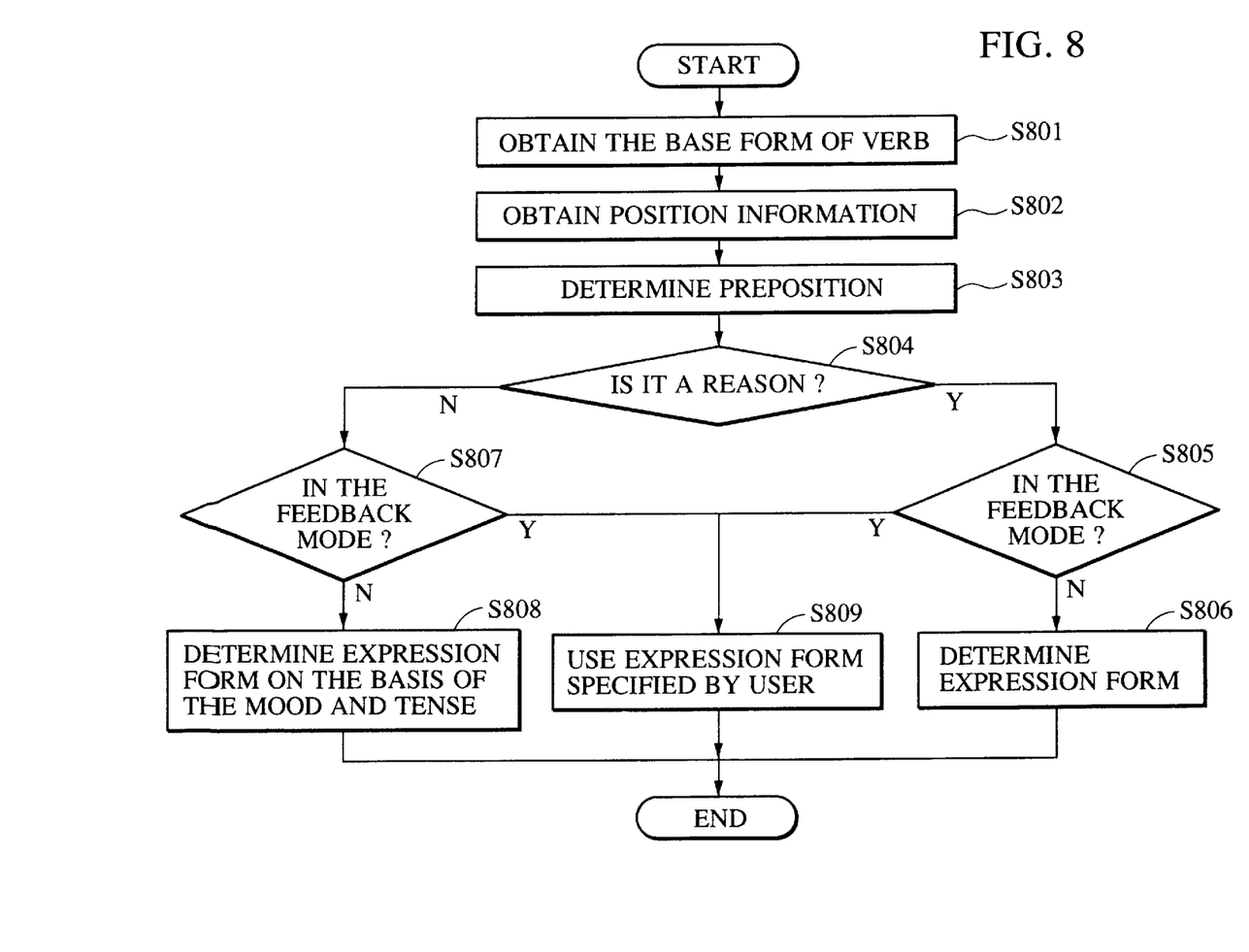
FIG. 8 is a flowchart illustrating the procedure for determining the form of expressing a verb.

FIG. 8 is a flowchart illustrating the procedure for determining the form of expressing a verb.

In the feedback, the expression form designated by the user is used to construct a sentence.

The expression form, words, and the selection of the style of a sentence depend upon the user himself/herself, and it is not easy for the system to determine them. It is therefore desirable that not only the selection made by the user be learned for future use, but also the selection be applied to the current input. However, a check is necessary for insufficient knowledge and inadvertent mistakes (in particular, in case of a hurry). For example, the word which is not selected by the system for some reason, for example, to avoid repetition of the same word, might be selected by the user.

Figure 9:
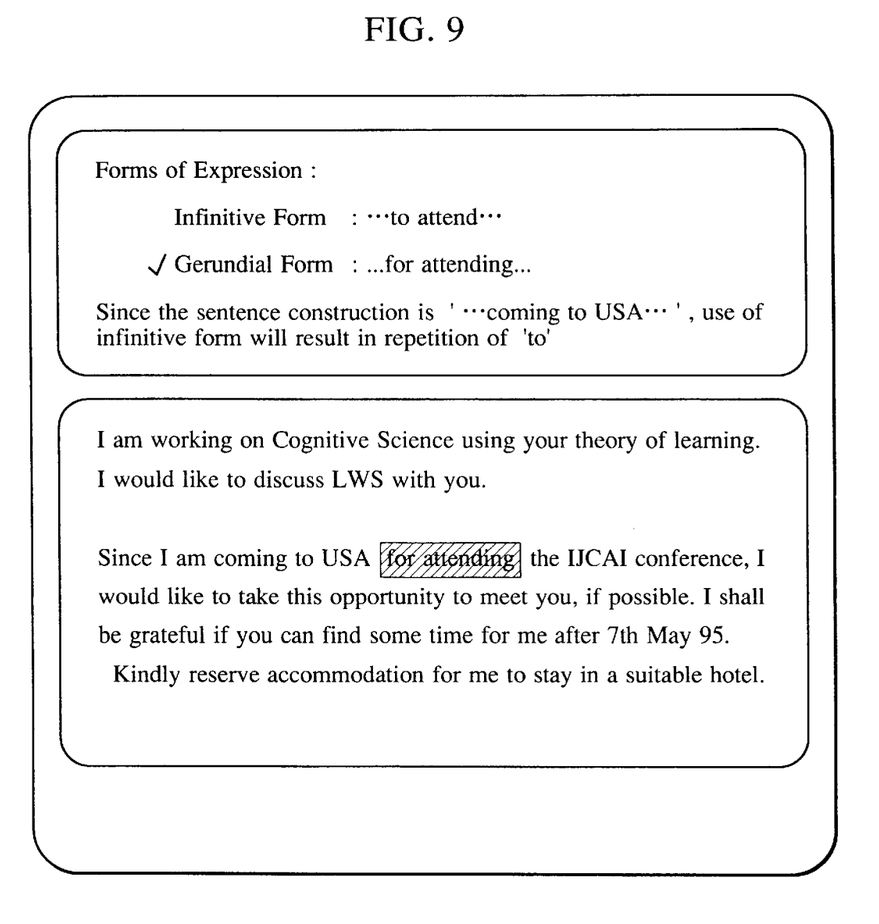
FIG. 9 shows an example of a display of a processed result for the user.

FIG. 9 shows an example of a display of a processed result for the user. Referring to FIG. 9, "for attending" is selected for replacement, and "to attend" is displayed as a candidate together with the selected "for attending". In this case, the system uses "for attending" in the form of a gerund rather than "to attend" in the form of an infinitive. When "for attending" is selected as a replacement candidate, this reason is also displayed together. Even in this case, the user is able to change it to the form of an infinitive. Since this selection affects the form of the sentence, the selection is processed by the generator, and the entire sentence is regenerated. In the regeneration process, for example, the gerund form in another portion is changed to an infinitive form. In a case where "to" which is added as a result of the correction in a certain portion, and "to" in the form of an infinitive before and after that portion repeat, the infinitive form may be changed to a gerund form in order to avoid this repetition.

Figure 10:
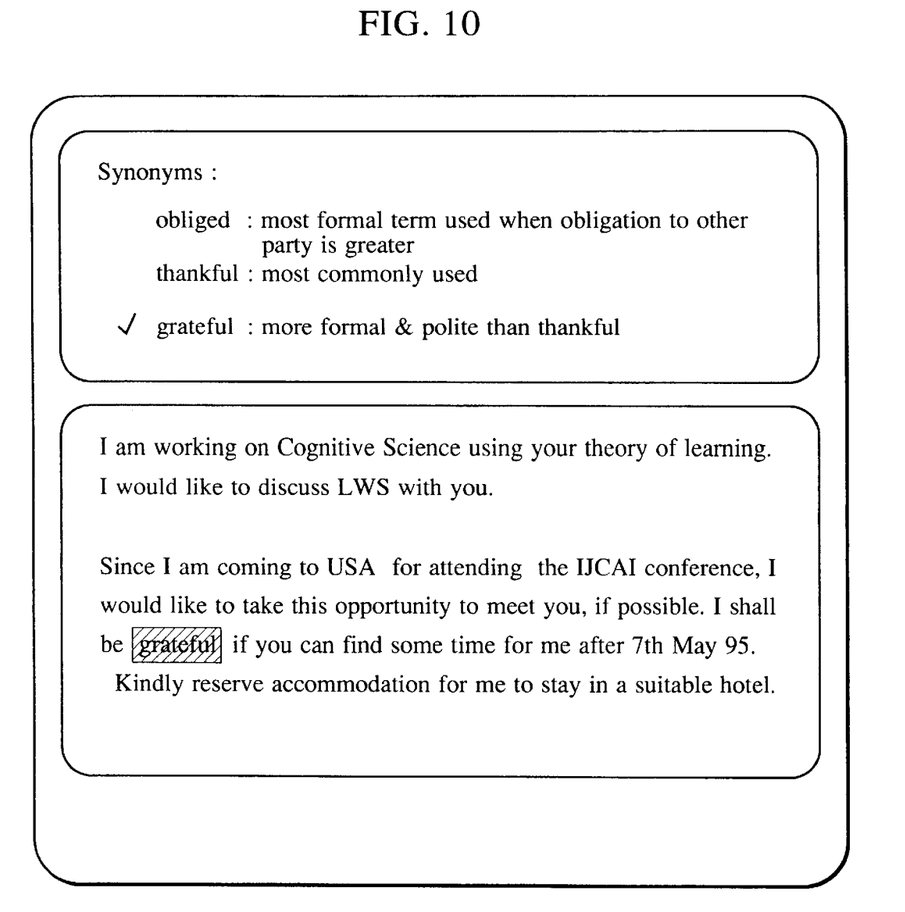
FIG. 10 shows an example of a selection of synonyms.

FIG. 10 shows an example of a selection of synonyms. Referring to FIG. 10, the system uses "grateful"in the "I shall be grateful", and the user is able to select "obliged" or "thankful" in place of the above expression. In this case, the generator not only generates the sentence again, but also learns this selection. As shown in FIG. 10, the differences in the nuances of each word are shown for the sake of selection by the user.

Figure 11:
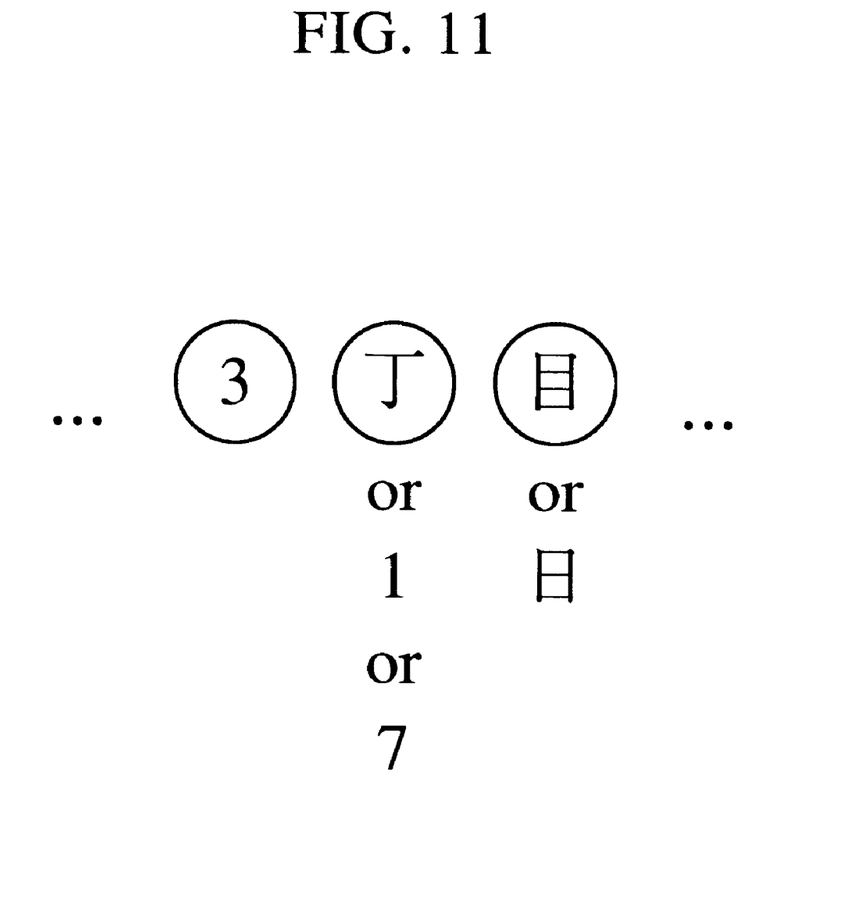
FIG. 11 shows a character recognition result.

FIG. 11 shows the character recognition result of this processing object. The character within the circle is the first candidate, and below the character is another candidate. The combination of the first candidates is "3丁日" (Japanese reading: 3-chome), and makes sense as an "address". Here, if the user selects "日" which is a day mark in place of "日", the recognized result which has already been obtained is rechecked. Thereupon, "3丁日", does not makes sense, and "37日" is invalid as day, but "31日" is valid as day. Therefore, "丁" is changed to "1".

If the user changes "I" to "We" in the first sentence after the system generates a sentence using "I" as a person in the natural language generation system, the system infers that the entire sentence must be changed to this person, and regenerates the entire text on the basis of the new person, making it possible to change the person and the form of the verb. Similarly, it is possible to reflect a change made in a certain portion in the entire text.

As has been described up to this point, according to this embodiment, a processed result can be corrected by a review based on a correction in response to the correction performed on a part in a set of processed parts.

The present invention described above may be applied to a system constituted of a plurality of computers, or a specific computer within a system. Also, the present invention may be applied to a case in which an achievement is made by a computer executing a program. This program may be supplied from an external storage medium, and the storage medium for storing this program is within the scope of the present invention.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A reviewing system, comprising:

input means for inputting information;

processing means for applying a processing to input information from said input means to obtain processed results in a form of natural language;

output means for outputting the processed results in the form of natural language of said processing means;

correcting means for designating and correcting a word of the processed results in the form of natural language output from said output means; and control means for controlling said processing means so that the processing of said input information or of a part of said input information is reapplied to correct a word in the processed results, which is different than the designated word, thereby conforming the corrected results.

2. A reviewing system according to claim 1, wherein said processing means includes a knowledge base in which knowledge of language is stored, and generation means for generating natural language information corresponding to a concept represented by the input information by referring to the knowledge of the knowledge base.

3. A reviewing system according to claim 2, wherein said correcting means corrects words or phrases of a part of the generated natural language information to synonymous words or phrases.

4. A reviewing system according to claim 2, wherein said correcting means changes an expression form of words and phrases of a part of the generated natural language information.

5. A reviewing system according to claim 2, wherein, when the processing is reapplied, said generation means generates natural language information so that generated information of a corrected part corresponds to the corrected result.

6. A reviewing system according to claim 1, wherein said correcting means includes candidate output means for outputting other candidates which can be replaced for a part of the processed results.

7. A reviewing system according to claim 6, wherein said candidate output means includes means for outputting information regarding the differences between the candidates.

8. A reviewing system according to claim 1, wherein said correcting means includes means for outputting, in response to a request, a reason why a specific candidate is selected as a processed result from among a plurality of candidates.

9. A reviewing system according to claim 1, wherein, when the processing is reapplied, said processing means performs the processing so that the processed results of other than the corrected results conform to said corrected results.

10. A reviewing system according to claim 1, wherein the processing is reapplied, said processing means performs the processing so that a processed result of a corrected part corresponds to the corrected result.

11. A reviewing method, comprising the steps of:

inputting information;

applying a processing to the input information to obtain processed results in a form of natural language;

outputting the processed results in the form of natural language;

designating and correcting a word of the processed results in the form of natural language output from said outputting step; and reapplying the processing to said input information or to a part of said input information to correct a word in the processed results, which is different than the designated word, thereby conforming the corrected result.

12. A reviewing method according to claim 11, wherein said processing includes a generation step for generating natural language information corresponding to a concept represented by the input information by referring to the knowledge of a knowledge base in which the knowledge of languages is stored.

13. A reviewing method according to claim 12, wherein said correcting step corrects words or phrases of a part of the generated natural language information to synonymous words or phrases.

14. A reviewing method according to claim 12, wherein said correcting step changes an expressions form of words and phrases of a part of the generated natural language information.

15. A reviewing method according to claim 12, wherein, when the processing is reapplied, said generation means is performed so that generated information of a corrected part corresponds to the corrected result.

16. A reviewing method according to claim 11, wherein said correcting step includes a candidate outputting step for outputting other candidates which can be replaced for a part of the processed results.

17. A reviewing method according to claim 16, wherein said candidate outputting step includes a step for outputting information regarding differences between the candidates.

18. A reviewing method according to claim 11, wherein said correcting step includes a step for outputting, in response to a reason why a specific candidate is selected as a processed result from among a plurality of candidates.

19. A reviewing method according to claim 11, wherein, when the processing is reapplied, the processing is performed so that the processed results of other than said corrected results conform to said corrected results.

20. A reviewing method according to claim 11, wherein, when the processing is reapplied, said processing is performed so that a processed result of a corrected part corresponds to the corrected result.

21. A computer-readable storage medium storing a reviewing program for controlling a computer to perform reviewing, said program comprising codes for causing the computer to perform the steps of:

inputting information;

applying a processing to the input information to obtain processed result in the form of natural language;

outputting the processed result in the form of natural language;

designating and correcting a word of the processed results in the form of natural language output from said outputting step; and reapplying the processing to said input information or to a part of said input information to correct a word in the processed results, which is different than the designated word, thereby conforming the corrected result.

\* \* \* \* \*